(12) United States Patent  (10) Patent No.: US 8,922,045 B2
Bonney                      (45) Date of Patent:     Dec. 30, 2014

(54) ELECTRICAL POWER GENERATING SYSTEM USING A WATER WHEEL

(71) Applicant: Todd Bonney, Mt. Pleasant, SC (US)

(72) Inventor: Todd Bonney, Mt. Pleasant, SC (US)

( * ) Notice: Subject to any disclaimer, the term of this patent is extended or adjusted under 35 U.S.C. 154(b) by 80 days.

(21) Appl. No.: 13/837,461

(22) Filed: Mar. 15, 2013

(65) Prior Publication Data

US 2014/0265343 A1  Sep. 18, 2014

(51) Int. Cl.
*F03B 13/00* (2006.01)
*H02P 9/04* (2006.01)
*F03B 13/10* (2006.01)

(52) U.S. Cl.
CPC .................................. *F03B 13/10* (2013.01)
USPC ........................................................ 290/54

(58) Field of Classification Search
CPC ....... Y02E 10/28; Y02E 10/22; Y02E 10/223; Y02E 10/20; Y02E 10/00; F03B 17/061; F03B 13/10; F05B 2240/40
USPC .......................................... 290/54, 53, 42, 43
See application file for complete search history.

(56) References Cited

U.S. PATENT DOCUMENTS

| | | | |
|---|---|---|---|
| 163,451 A | 5/1875 | Buckner, Jr. | |
| 537,398 A | 4/1895 | Wilde | |
| 584,367 A | 6/1897 | Keller | |
| 651,454 A | 6/1900 | Wilkinson | |
| 903,592 A * | 11/1908 | Low | 440/9 |
| 946,585 A | 1/1910 | Smith | |
| 1,333,443 A | 3/1920 | Rennolds | |
| 1,898,973 A | 2/1933 | Lansing | |
| 2,700,874 A | 2/1955 | Roure | |
| 3,619,632 A | 11/1971 | Labombarde | |
| 3,984,698 A | 10/1976 | Brewer | |
| 3,993,913 A | 11/1976 | Dickman | |
| 4,102,291 A | 7/1978 | Sebald | |
| 4,176,283 A | 11/1979 | McLaren | |
| 4,188,546 A | 2/1980 | Kossler | |
| 4,371,346 A | 2/1983 | Vidal | |
| 4,868,408 A | 9/1989 | Hesh | |
| 5,644,170 A * | 7/1997 | Bynum et al. | 290/43 |
| 7,199,483 B2 | 4/2007 | Lomerson, Sr. et al. | |
| 7,476,986 B1 | 1/2009 | Del Principe | |
| 7,492,054 B2 | 2/2009 | Catlin | |
| 2007/0108768 A1 | 5/2007 | Dempster | |
| 2008/0211232 A1 | 9/2008 | Helfrich | |
| 2010/0237625 A1 | 9/2010 | Dempster | |
| 2010/0242826 A1 | 9/2010 | Koivusaari et al. | |

* cited by examiner

*Primary Examiner* — Javaid Nasri
(74) *Attorney, Agent, or Firm* — Ernest B. Lipscomb, III; Barnwell Whaley Patterson Helms

(57) ABSTRACT

There is provided a power generating system to recharge the batteries of a boat as the boat moves under power through a body of water. The electrical generating system has a relatively large water wheel connected to a boat. As the boat moves through the water, the water wheel turns producing energy and, through a series of pulleys and wheel gears and then to a generator or alternator and then the electrical energy is passed to a battery. The water wheel may be mounted on the stern of the boat, or to the side of the boat, or in a cut out portion in the bottom of the boat.

5 Claims, 4 Drawing Sheets

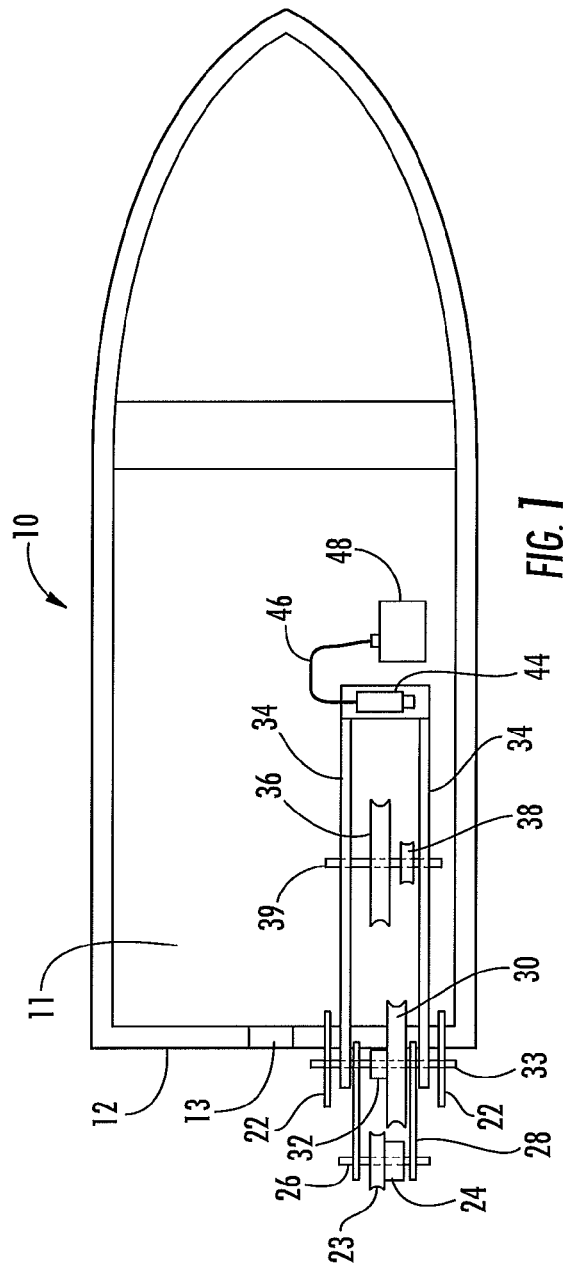
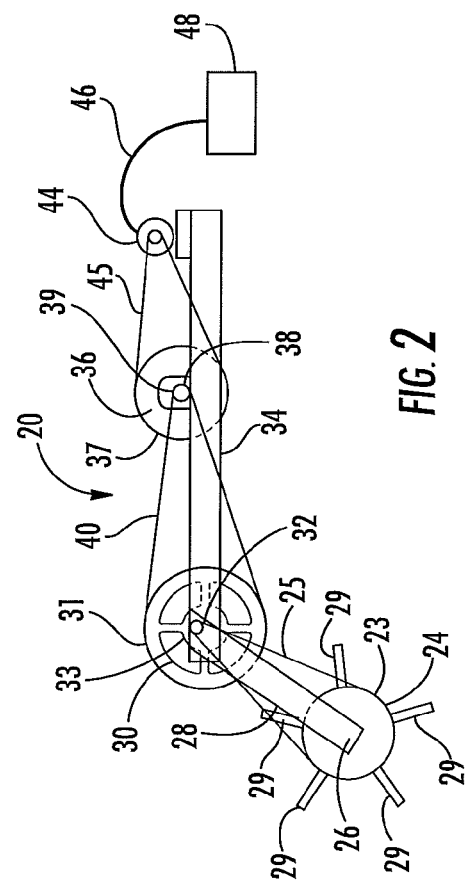

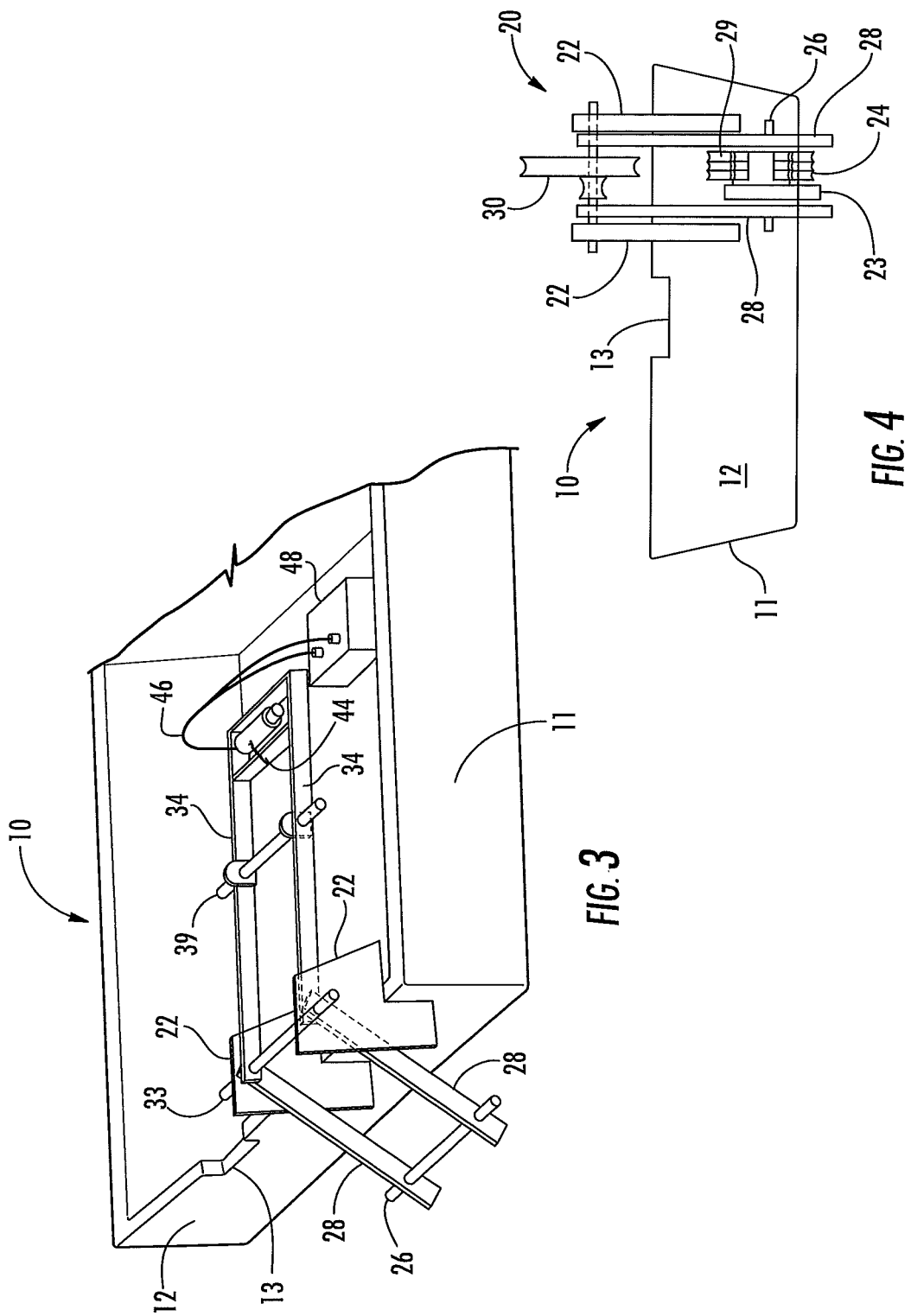

ELECTRICAL POWER GENERATING SYSTEM USING A WATER WHEEL

BACKGROUND OF THE INVENTION

1. Field of Invention

This invention relates generally to an improved system for producing electricity by using energy from water. More particularly, the present invention relates to an improved system in which electricity is generated by a paddle wheel connected to a generator.

2. Description of Prior Art

The desire to produce energy from flowing water in a river, tides, or the like, dates back well over 100 years. For example, U.S. Pat. No. 163,451, to Buckner, et al, issued in 1875, discloses a system to produce power from waves that includes a buoy actuated by the rise and fall of waves provided within guide rods that operate within six (6) socket plates, and adjustable racks for engaging the roof pinions, pawls and racket wheels. The rise and fall of the buoy with the wave action serves to rotate the gears to produce energy. U.S. Pat. No. 537,398, to Wilde, issued in 1895, describes a tidal power device in which incoming tidal water passes through a water wheel to a storage reservoir, releasing the water from the storage reservoir past the water wheel to transmit power from the wheel to a pulley and then to a dynamo. The end of the water wheel is connected to a circular rack which engages a gear and is adapted to move vertically by having its lower end journaled in a box mounted on the protruding end of an axle to transmit motion from a pulley to a dynamo or other suitable machine by a belt connection or any other suitable manner.

U.S. Pat. No. 651,454, to Wilkinson describes a motor which utilizes the ebb and flow of the tide to supply energy, having a combination of a high and low tide reservoir, each having an outlet and inlet channel, connecting the reservoir to the main body of water subject to the action of the tide. There is a water wheel in a channel leading from each of the reservoirs, which is adapted to be operated on during certain periods of the day by the water flowing into the low tide reservoir from the main body of water, and the other wheel adapted to operated during certain periods of time by the water flowing out of the high tide reservoir, and means to utilize the power generated by each water wheel, at times co-jointly, and at other times separately. On the shaft of each water wheel is a gear wheel working in mesh with another gear wheel mounted on another shaft to coordinate the two wheels. A power pulley is used to transfer the energy from the water wheels. U.S. Pat. No. 946,585, to Smith discloses an electrical generating system having two water wheels operating in parallel using the flow of water as motive power to turn pulleys with belts extending over other guide pulleys into a mill or power house. U.S. Pat. No. 1,333,443, to Rennolds shows a series of water wheels (one behind the other in a raceway). The series of wheels is geared to a common driving shaft and there are provisions whereby the wheels will turn one way when the tide is coming in, and in the opposite direction when the tide is going out, and will give a reasonably constant motion to the power shaft to which the wheels are connected.

Boats, in general, either lack electricity-generating means or only have such means when a gasoline engine is used to operate a generator. However, even when a gasoline engine is present on the craft, there are situations in which its use is either not convenient or impractical. Thus, it would be desirable to have a power-generating means which could keep a battery charged while a craft is in motion or at anchor in a current. Such a power-generating means would not only keep batteries charged but could also provide a continuous current when an electric motor is used to propel the boat and when other electrical apparatus on the craft are used.

Propeller operated generators on motor driven craft are known in the art, but they are not desirable because they are fixed and in a position which would increase the drag of the boat excessively, or because they are dependent on a rather high-speed craft for their utility. Some such power generating devices are disclosed in U.S. Pat. No. 1,898,973 to Lansing and U.S. Pat. No. 903,592 to Low, wherein a boat is driven by a central, stern-mounted, outboard motor with a submerged generator located off to one side, or in the keel area under the water line. In Low the hydroelectric impeller, or propeller, is located centrally of the stern of the boat, to remain submerged even during tilt of the boat, but the generator is above water level rather than being submerged.

SUMMARY OF THE PRESENT INVENTION

It is, therefore, the general object of the present invention to provide an electrical generating system for use in conjunction with boats, in which the generator is above water level and connected to a paddle wheel.

Another object of the present invention is to provide such an electrical generating system which is compact and which will not contribute excessively to the drag of the boat in the water even when it is being operated under power.

Yet another object of the present invention is to provide an electrical generating system that is operable by a relatively slow-moving fluid stream and having a motor attached to said electrical generating system for turning a shaft capable of having a series of attachments connected thereto, such as a saw blade, a drill, or the like.

There is provided a power generating system to recharge the batteries of a boat as the boat moves under power through a body of water. The invention comprises a device having a relatively large water wheel preferably mounted on the back end of a boat and behind a channel that formed in the bottom of a boat. As the boat moves through the water, the water wheel turns producing kinetic energy and, through a series of pulleys, the kinetic energy is passed through a gear assembly, and then to a generator or alternator mounted inside the boat. The water wheel may be mounted on the stern of the boat, or to the side of the boat, or in a cut out portion in the bottom of the boat.

In another embodiment of the electrical system of this invention, a broader aspect of the invention, there is provided an electrical system for generating energy which comprises a housing that may be attached to a dock or the like, a water wheel attached to the main housing so that the water wheel is free to rotate and thereby generate kinetic energy, a series of pulleys and gears for converting the kinetic energy of the water wheel into electrical energy (an electrical generator), and a motor attached to said electrical generator for turning a shaft capable of having a series of attachments connected thereto, such as a saw blade, a drill, or the like.

The above objects have been substantially accomplished by provision of apparatus comprising a relatively large paddle wheel mounted on the back end of the boat and behind the channel that is formed in the bottom of the boat, through a speed-increasing gear assembly, to a generator mounted inside the boat. The water wheel is mounted on the stern of the boat and the wheel turns when water flow through the channel in the bottom of the boat. The most advantageous form of generator is that commonly called an alternator. The water wheel which is the prime mover in the apparatus of the invention, in order to provide sufficient torque at slow water speeds is relatively large. The water wheel turns at a relatively slow speed. The water wheel is connected to the generator by a system of pulleys and belts to produce kinetic energy. The turning speed of the water wheel is increased by pulleys and belts.

Other objects features and advantages of the present invention will become apparent from the following detailed description of the invention taken in conjunction with the accompanying drawings.

BRIEF DESCRIPTION OF THE DRAWINGS

Having described the invention in general terms, reference will now be made to the accompanying drawings, which are not necessarily drawn to scale, and wherein:

FIG. 1 is a top view of a boat illustrating the system for generating electrical power of the present invention showing an embodiment of a water wheel connected to the stern of the boat;

FIG. 2 is a partial side view of the electrical generating assembly of the present invention;

FIG. 3 is a partial perspective of a boat illustrating the system for generating electrical power of the present invention showing the structure for holding the water wheel and related elements;

FIG. 4 is a rear view of a boat illustrating the system for generating electrical power of the present invention showing an embodiment of a water wheel connected to the stern of the boat;

DETAILED DESCRIPTION OF THE PREFERRED EMBODIMENTS

Figure 5:
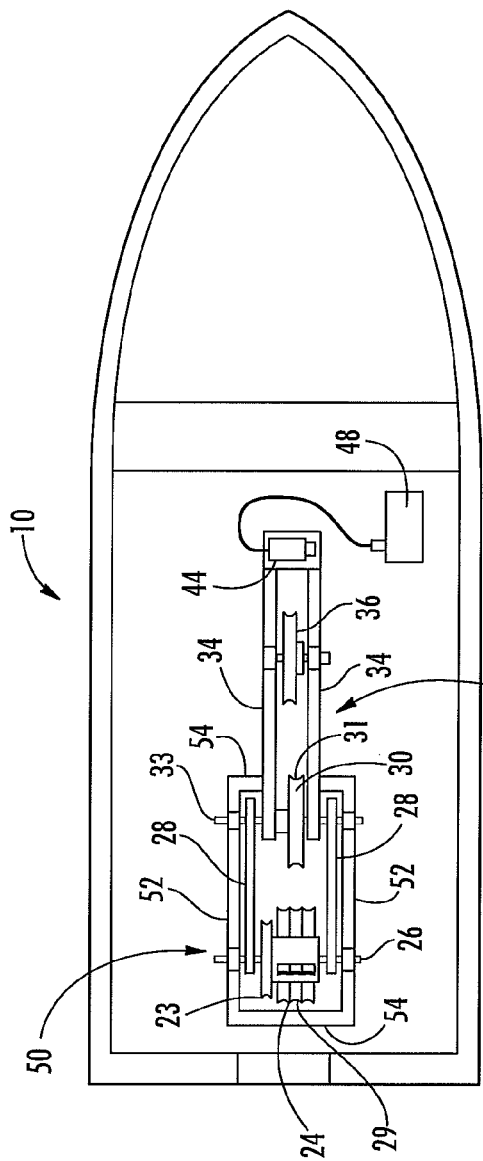
FIG. 5 is a top view of a boat illustrating a second embodiment of the system for generating electrical power of the present invention showing the water wheel located within a well in the interior of a boat.

The present invention now will be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. Like numbers refer to the elements through out.

There are several locations for placing the electrical generating system 20 of the present invention on a boat. One of these locations is on the stern of a boat 10 such as that shown in FIG. 3 wherein the electrical generating assembly 20 is connected to the boat 10 by side wall supports 22. The remainder of the electrical system is explained in detail with reference to FIG. 1 and FIG. 2.

Turning now to FIG. 1 there is shown an embodiment of the system for generating electrical power 20 from water of the present invention connected to a boat 10 as the boat moves through the water showing the water wheel, the pulleys and the generator for producing electricity. The belts for transferring energy from the water wheel to and through the pulleys are not shown in FIG. 1 so that the arrangement of elements will be clearly seen. In this embodiment of the invention, the hull 11, is of any known or suitable type and may be a power boat or a sail boat. In the case of a power boat a conventional outboard motor is secured to the stern board 13, usually at the center of the stern 12.

The electrical generating assembly 20 is shown most clearly in the partial cutaway of FIG. 2 wherein the electrical generating assembly 20 in the embodiment of FIG. 1 is located at the stern of the boat and is held in placed by assembly side wall supports 22. The electrical generating assembly 20 includes a water wheel 24 having an outer rim 23 connected on an axle 26 mounted through a journal 26 to water wheel supports 28. If desired, the assembly side wall supports 22 may be braced to support the water wheel 24 at an appropriate distance from the stern 12. The water wheel 24 has a plurality of outwardly extending fins 29. A first pulley 30 is journaled on an axle 33 through the upper portion of assembly supports 22. The pulley 30 has an outer rim 31 and a smaller diameter wheel gear 32 is also connected to axle 33. A pair of pulley support beams 34 extend from assembly side supports 22 toward in interior of the boat. A belt 25 passes around outer rim 23 of water wheel 24 and wheel gear 32 of pulley 30. As the boat moves through the water the water wheel 24 turns causing the belt 25 to rotate wheel gear 32 attached to axle of pulley 30.

A second pulley 36 having an outer rim 37 and a smaller diameter wheel gear 38 is mounted to the support beams 34 through an axle journaled 39 on the support beams 34. A second belt 40 extends around the outer rim 31 of first pulley 30 and around the wheel gear 38 connected to the second pulley 36 resulting in an increase of energy being produced. The energy being produced is transferred via belt 45 to a generator 44 (or alternator) mounted on support beams 34 inside the boat. As the water wheel 24 turns it produces electricity through the transfer of energy through the pulleys and wheel gears to the generator 44. The electricity is passed thorough wires 46 to charge battery 48.

FIG. 4 is a rear view of a boat equipped with the generating electrical system 20 of the present invention. The electrical generating assembly 20 includes assembly supports 22 having water wheel supports 28 connected thereto and a water wheel 24 having an outer rim 23 connected on an axle 26 mounted through a journal 26 that extends through the water wheel supports 28. The water wheel 24 has a plurality of outwardly extending fins 29. A first pulley 30 is journaled on an axle 33 through the upper portion of assembly supports 22. The pulley 30 has an outer rim 31 and a smaller diameter wheel gear 32 is also connected to axle 33.

A preferred embodiment of the system for generating electrical power of the present invention is shown in FIG. 5. The electrical generating assembly 20 is similar to that described in FIG. 1 except that the system is located within the hull of the boat. Referring to FIG. 5 there is provided a well 50 having side walls 52 and end walls 54 that extend upwardly from the bottom of the boat a sufficient distance to prevent water from entering the boat through the well. In this embodiment the side walls 52 serve to replace the assembly side wall supports 22 of the embodiment of FIG. 1. As with the embodiment of FIG. 1, the electrical generating assembly 20 includes a water wheel 24 having an outer rim 23 connected on an axle 26 mounted through a journal 26 to water wheel supports 28. The water wheel 24 has a plurality of outwardly extending fins 29. A first pulley 30 is journaled on an axle 33 through the upper portion of side walls 52. The pulley 30 has an outer rim 31 and a smaller diameter wheel gear 32 is also connected to axle 33. A pair of pulley support beams 34 extend from assembly side supports 22 toward in interior of the boat. A belt (not shown) passes around outer rim 23 of water wheel 24 and wheel gear 32 of pulley 30. As the boat moves through the water the water wheel 24 turns causing a belt (not shown) to rotate wheel gear 32 attached to axle of pulley 30. A second pulley 36 having an outer rim 37 and a smaller diameter wheel gear 38 is mounted to the support beams 34 through an axle journaled 39 on the support beams 34. A second belt (not shown) extends around the outer rim 31 of first pulley 30 and around the wheel gear 38 connected to the second pulley 36 resulting in an increase of energy being produced. The energy produced is transferred via a belt to a generator 44 (or alternator) mounted on support beams 34 inside the boat. As the water wheel 24 turns it produces electricity through the transfer of energy through the pulleys and wheel gears to the generator 44. The electricity is passed thorough wires to charge battery 48.

Figure 6:
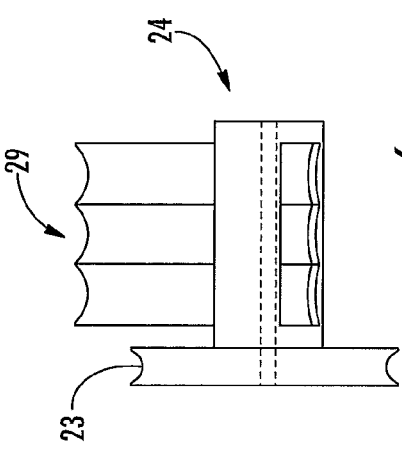
FIG. 6 is an enlarged view of a preferred embodiment of the water wheel of the present invention.

FIG. 6 is an enlarged view of water wheel 24. The water wheel 24 has an outer rim 23 as part of the body of the wheel 24. The outer rim 23 is some what larger that the body and has a groove surrounding the outer portion of the rim to accommodate a belt for transferring the energy produced by the turning water wheel to an adjacent wheel gear to increase the ratio of energy produced. The body of the water wheel has a plurality of outwardly extending fins 29 for catching the water as the wheel rotates. While the number of fins is not limited by this invention, it has been found that a series of five fins provides good results.

Figure 7:
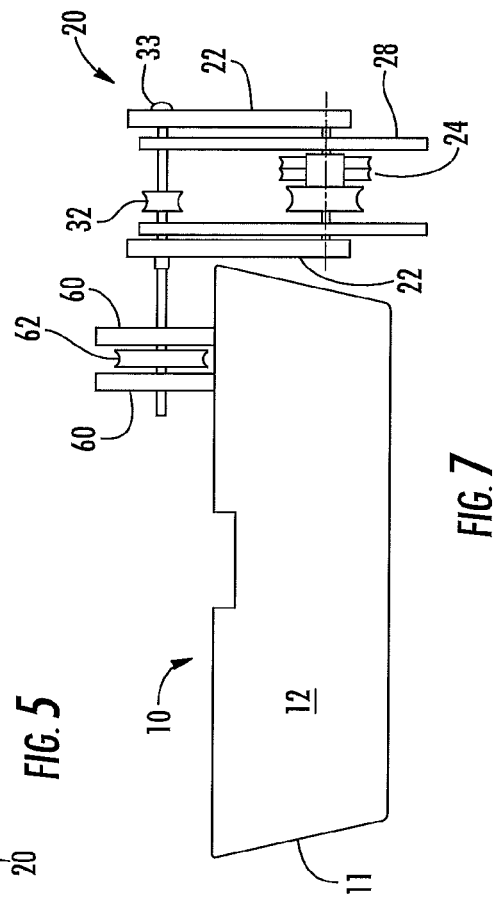
FIG. 7 shows a third embodiment of the system for generating electrical power of the present invention showing the water wheel connected to the side of the boat.

A third embodiment of the system for generating electrical power of the present invention is shown in FIG. 7. In this embodiment, a portion of the electrical power generating system 20 is positioned at the side of the boat 10. The portions of the system 20 having the water wheel 24 and the gear wheel 32 are connected to the outside of the boat. The energy produced from gear wheel 32 is transferred along axis 33 to pulley 62 located inside of the boat. Pulley 62 is supported by a pair of braces 60. The support from braces 60 balances the weights of the portion of the system outside of the boat. The energy from pulley 62 is passed to another pulley as shown in the other embodiments.

The electrical assembly is operated as the boat moves through the water. The water wheel turns producing kinetic energy and, through a series of pulleys, the kinetic energy is passed through a gear assembly, and then to a generator or alternator mounted inside the boat. The water wheel may be mounted on the stern of the boat, or to the side of the boat, or in a cut out portion in the bottom of the boat. In one preferred embodiment of this invention the boat has a specially designed hull whereby a channel is made in the middle of the hull which increases the amount of rotation on the water wheel when the embodiment of FIG. 5 is used.

Figure 8:
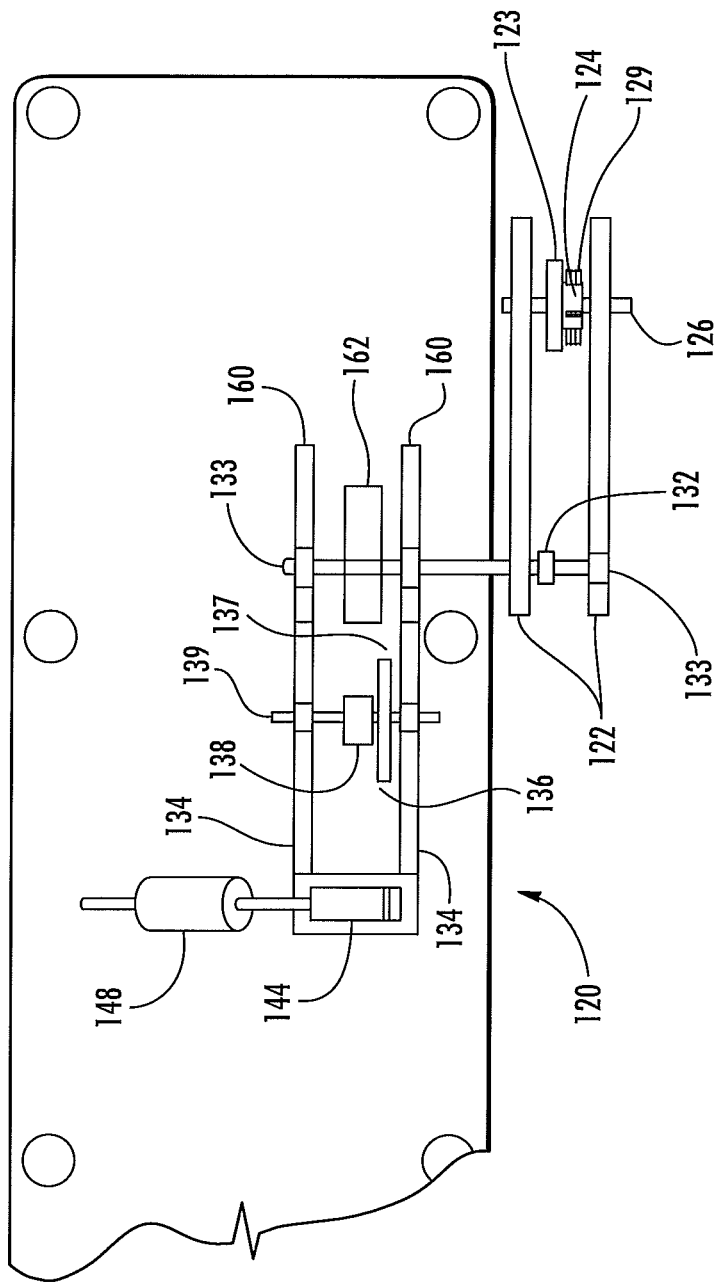
FIG. 8 illustrates another embodiment of the present invention attached to the side of a dock having water moving passed the water wheel to generate electricity for operating a motor and providing sufficient electricity to power a tool attached to the motor.

FIG. 8 illustrates another embodiment of the present invention. In this embodiment the electrical generating assembly 120 is attached to the side of a dock having water moving passed the water wheel 124 to generate electricity for operating a motor and providing sufficient electricity to power a tool attached to the motor. The operation of the electrical generating assembly 120 is similar to that of the assembly 20 described in reference to the embodiments of FIG. 1 and FIG. 7. The system for generating electrical power 120 shown in this embodiment is attached to the side of a dock. The water wheel 124 is held in position adjacent the dock by supports 122. The water wheel 124 has an outer rim 123 connected on an axle mounted through a journal 126 to water wheel supports 122. The water wheel 124 has a plurality of outwardly extending fins 129. A wheel gear 132 is journaled on an axle 133 through the upper portion of assembly supports 122. The energy produced from gear wheel 132 is transferred along axis 133 to pulley 162 located on the dock. Pulley 162 is supported by a pair of braces 160. The support from braces 160 balances the weights of the portion of the system outside of the dock. The energy from pulley 162 is passed to a second pulley 136 having an outer rim 137 and a smaller diameter wheel gear 138 is mounted to the support beams 134 through an axle journaled 139 on the support beams 134. A second belt (not shown) extends around the outer rim of first pulley 162 and around the wheel gear 138 connected to the second pulley 136 resulting in an increase of energy being produced. The energy being produced is transferred via a belt (not shown) to a generator 144 mounted on support beams 134. As the water wheel 124 turns it produces electricity through the transfer of energy through the pulleys and wheel gears to the generator 144. The electricity is passed thorough wires to motor 148. Motor 148 is capable of using for turning a shaft capable of having a series of attachments connected thereto, such as a saw blade, a drill, or the like.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included with the scope of the appended claims. Although specific terms are employed herein, they are used in a generic and descriptive sense only and not for purposes of limitation.

What is claimed is:

1. A system for generating electrical power from water as a boat moves through the water comprising:
   (a) a boat having an electrical generating assembly attached thereto,
   (b) said assembly comprising:
      (1) a water wheel mounted on a journal, said water wheel being capable of transferring energy to a pulley when said boat is in motion
      (2) said pulley having an outer rim and a first wheel gear that is smaller in diameter than said outer rim whereby energy from said water wheel is transferred to said outer rim;
      (2) a second pulley having an outer rim capable of receiving energy from said first wheel gear and a second wheel gear that is smaller in diameter than said outer rim of said second pulley;
      (3) a generator capable of receiving energy from said second pulley and transferring said energy to charge a battery.

2. The system for generating electrical power according to claim 1 wherein said water wheel is mounted on a stern of said boat.

3. The system for generating electrical power according to claim 1 wherein said water wheel is mounted to sides of a well cut in a bottom of said boat.

4. The system for generating electrical power according to claim 1 wherein said water wheel is mounted to a side of said boat.

5. The system for generating electrical power according to claim wherein said water wheel has a plurality of outwardly extending fins.

* * * * *